Feb. 27, 1968     K. PILARCZYK ET AL     3,370,334

METHOD OF MAKING TILTING SHOE JOURNAL BEARINGS

Original Filed Oct. 28, 1964

INVENTORS
KAROL PILARCZYK &
JAMES R. PRAIRIE
BY
ATTORNEYS

United States Patent Office 3,370,334
Patented Feb. 27, 1968

3,370,334
METHOD OF MAKING TILTING SHOE JOURNAL BEARINGS
Karol Pilarczyk, Morrisville, and James R. Prairie, Fallsington, Pa., assignors to De Laval Turbine Inc., Trenton, N.J., a corporation of Delaware
Original application Oct. 28, 1964, Ser. No. 407,090, now Patent No. 3,318,643, dated May 9, 1967. Divided and this application Feb. 17, 1967, Ser. No. 616,938
3 Claims. (Cl. 29—149.5)

ABSTRACT OF THE DISCLOSURE

Shoes for tilting shoe journal bearings are formed by machining a metal ring, and babbitting its internal bore, and cutting the ring into segments. The cuts are made so that small pieces are removed which have parallel faces. The faces of the bearing shoes converge toward the center of the bore, and the shoes may be inserted into a housing and held in place by pins parallel with the bearing axis and engaging the end faces of the shoes.

Cross reference to related application

This is a division of our application Ser. No. 407,090, filed Oct. 28, 1964, now Patent No. 3,318,643, granted May 9, 1967.

Background of the invention

This invention relates to tilting shoe journal bearings, and has particular reference to bearings for use in high speed rotary devices such as centrifugal compressors, turbines, or the like.

In the design of high speed rotary machines, one of the most significant problems which arises relates to minimizing the deleterious effects of rotor vibration. A common cause of rotor vibration is displacement of the center of mass of the rotor from the axis of rotation. This condition is known as rotor unbalance. In this case, the resulting vibration occurs at the running frequency. Another significant cause of vibration is known as "half-frequency whirl," which involves the tendency of a shift to vibrate at half its running frequency. This type of vibration can occur at any speed, and causes resonant vibrations when it occurs at twice the first critical speed.

A third cause of vibration, known as "oil whip" or "oil whirl," occurs at speeds above twice the first critical speed. This third cause of vibration always excites a rotor vibration at the frequency corresponding to the first critical frequency. In most machines, oil whip or oil whirl begins to cause disturbance at rotor speeds ranging from twice to five times the first critical speed.

A large number of ingenious bearing designs have been developed to overcome these problems. One of the most successful of these designs has been the tilting shoe bearing. Described generally, it comprises a plurality of shoes equally spaced around the circumference of a journal. The shoes are held in a housing by various means, and are adapted to rock back and forth in the housing so that, when oil is introduced into the housing, the shoes can adjust themselves in response to the hydrodynamic forces generated by the rotating journal, so that an optimum oil wedge is established between the journal and each shoe. Because of the circumferential separations between the shoes, a continuous oil film cannot exist between the shoes and the journal. Thus, instabilities associated with a rotating oil film cannot exist.

Regarding the damping of journal vibrations, the rocking action of tilting shoes accommodates displacement of the journal while it maintains an oil wedge. Effective damping of journal vibration is thus accomplished.

With an inflexible bearing, even small displacements of a journal can cause severe loading in the bearing and consequent damage. Furthermore, heavy vibration is transmitted through the bearing structure to the supporting structure. Therefore, it is desirable to minimize the effects of shaft vibration. If some flexibility is provided so that some transverse motion of the journal is allowed, the forces due to this motion become insignificant. The rocking action of the shoes permits transverse motion of the journal while an optimum oil wedge is maintained.

Various methods have been proposed for the construction of tilting shoe bearings. One common method involves the provision of radial pins which prevent the rotation of the shoes with the journal. These pins must be loose-fitting so that they permit rocking of the shoes. Consequently, the shoes cannot be easily held in the housing when the journal is not in place. The provision of loose-fitting holes for the restraining pins in prior tilting-shoe bearings has a marked effect on the temperature distribution in the shoes. Uneven temperature distribution results in non-uniform expansion of the shoes, which is undesirable from the standpoint of dimensional stability of the shoes in operation.

Summary of the invention

The primary object of the invention is to provide a method for making tilting-shoe bearings, which comprises a small number of easily performed steps.

A further object is to provide a method for making bearing shoes, which results in bearing shoes which are easily maintained in a fixed relationship with their housing, and which are constructed so that frictional heating results in uniform expansion of the shoes.

The method accomplishing these and other objects of the present invention will become apparent from the following description read in conjunction with the accompanying drawings, in which:

Description of the preferred embodiment

Figure 1:
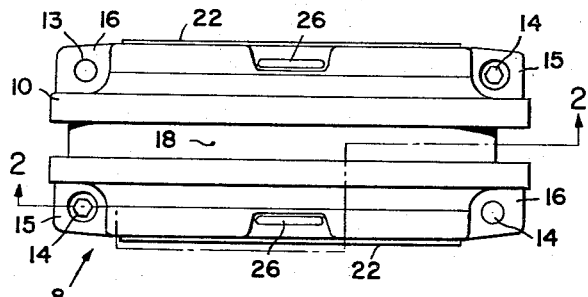
FIGURE 1 is an elevation of the top of a bearing shell in accordance with the present invention.
Figure 2:
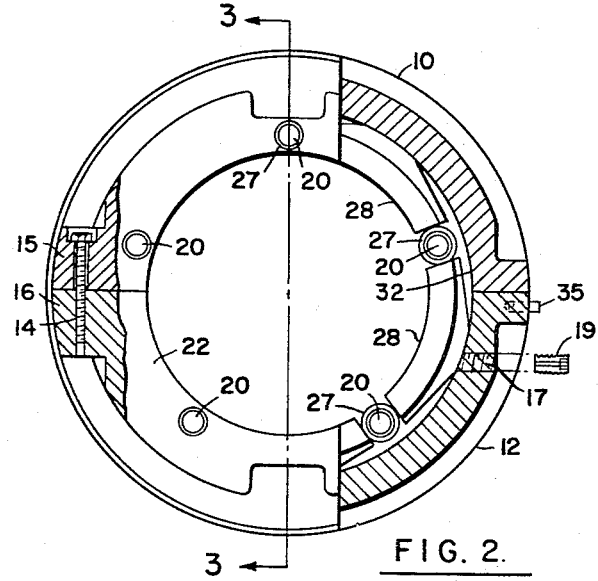
FIGURE 2 is a section through the apparatus shown in FIGURE 1 taken on the trace 2—2 thereof.

Referring to FIGURES 1 and 2, a bearing shell 8 is shown comprising upper and lower sections 10 and 12, respectively. These sections are maintained in alignment by means of dowels 13, which are placed in aligned holes provided in protruding portions 16 of the bearing sections. Sections 10 and 12 are held together by means of bolts 14, which are arranged to alternate sides to pass through protruding portions 15 of the bearing section 10, and which are threaded into protruding portion 15 of the bearing shell section 12.

A threaded hole 17 is provided in groove 18 in shell section 10, and a threaded adaptor 19 is provided to fit therein.

Figure 3:
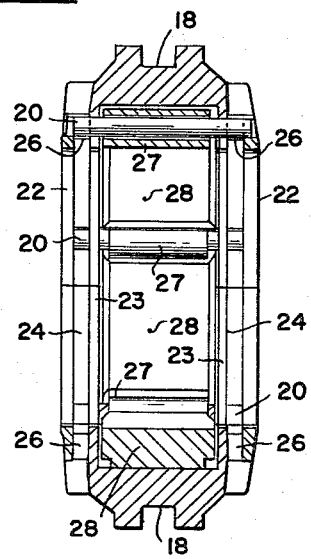
FIGURE 3 is a vertical section of the apparatus of FIGURE 2 taken on the trace 3—3 thereof.

Referring to FIGURES 2 and 3, pins 20 which are desirably spiral pins formed from sheets of spring metal, are arranged to pass through holes in portions 22 and 23 of the bearing shell sections. These spiral pins are held in place by virtue of their expansion within the holes provided within the bearing shell sections.

Grooves 24 are provided in the bearing shell sections between portions 22 and 23. These grooves 24 are provided with passages 26 communicating their interiors with the exterior of the bearing shell.

Sleeves 27 are provided as spacers, if required, around spiral pins 20 and between opposite portions 23 of the bearing shell.

Figure 4:
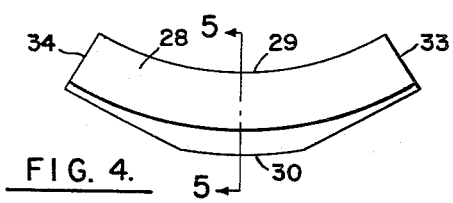
FIGURE 4 is a side elevation of a bearing shoe in accordance with the present invention.
Figure 5:
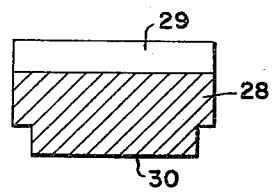
FIGURE 5 is a section taken on the trace 5—5 of FIGURE 4.
Figure 6:
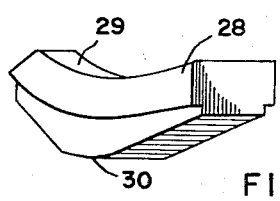
FIGURE 6 is a perspective view of a bearing shoe.

Referring to FIGURES 4, 5 and 6, bearing shoes 28 are shown in various orientations. Bearing shoe faces 29 are babbitted.

Referring to FIGURES 2, 4, 5 and 6, bearing shoes 28 are provided with a curved portion 30 adapted to engage surface 32 on the inside of the bearing shell. Bearing shoes 28 are held in place in the bearing shell by virtue of the provision of pins 20 and sleeves 27.

Figure 7:
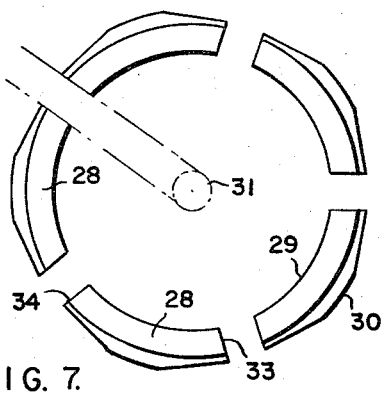
FIGURE 7 is a side elevation of a set of bearing shoes illustrating their positions within the bearing shell and illustrating a method of forming such bearing shoes.

Referring to FIGURE 7, bearing shoes 28 are shown in their orientation within the bearing shell. The bearing shoes are formed from a solid ring which is machined, finished and babbitted on its internal bore. The ring is then cut into the five identical segments shown in FIGURE 7. The cutting involves the removal of five small segments (not shown). These small segments are discarded. It is desirable that the pair of cuts required to remove each small segment be made along parallel planes as shown in FIGURE 7 so that the faces of each removed segment are parallel. These planes are tangent to an imaginary cylinder 31, coaxial with the bore and having the same diameter as sleeves 27. However, the faces may be cut in any direction so long as planes of the faces of each shoe 28 are not parallel and converge in the direction from the shoe toward the center of the bore. In this fashion the two side faces 33 and 34, created on each shoe, form a wedge which prevents the shoes from falling out from the shells during assembly or disassembly.

In operation, oil is introduced through the orifice in adaptor 19, and is recovered after it passes through passages 26. Lubrication of all of the bearing shoe faces is accomplished by virtue of journal rotaiton. Oil passing between the journal and portion 23 of the bearing shell flows into grooves 24 and through passages 26 to the exterior. Thus, a large quantity of oil is maintained within the bearing shell at all times.

Ordinarily the assembled bearing shell is mounted within a cylindrical bearing bracket which serves to close groove 18 forming a passage around the bearing shell. If the bearing bracket is provided with a suitable oil supply, oil can be made to flow around groove 18 and through the orifice in adaptor 19 to the interior of the bearing shell.

The flow of oil into the bearing shell can be adjusted by the provision of several adaptors 19 with orifices of various sizes.

With regard to the method of assembly of the bearing of the present invention, it will be apparent that the pins 20 and sleeves 27 are used to hold the bearing shoes in place. It is only necessary, then, to bolt the two assembled bearing sections together about the journal.

The shoes 28 are self-aligning. Sleeves 27 provide ample clearance for the bearing shoes 28 to rock back and forth within the bearing shell so that they align themselves with respect to the journal and form an optimum oil-wedge. Although the shoes are allowed to rock, they are prevented from travelling with the journal by pins 20 and sleeves 27.

Since there are no holes in the shoes for fasteners such as pins or bolts, the cross-sectional area of the shoe varies very little when cut by various planes in which the axis of the bearing lies. No abrupt changes in the cross-section of the shoe are found. Consequently, the temperature distribution within the shoe is quite even and is such as to promote uniform thermal expansion of the shoes in operation.

It will be apparent that various modifications can be made to the assembly of the present invention without departing from its scope as defined in the following claims.

We claim:

1. The method of producing a tilting shoe journal bearing comprising a housing having a cylindrical bore, a plurality of bearing shoes spaced within said housing, and a plurality of pins spaced around the interior of said housing, said pins being parallel to the axis of said bore and engaging the end faces of said shoes to separate said shoes, and said pins maintaining said shoes in engagement with the interior wall of said housing, which method comprises the steps of machining the inside face of a ring of solid metal to form a bearing surface, cutting said ring into a plurality of segments forming faces on the ends of each said segment for engaging said pins, the planes of said faces on each shoe converging in the direction from said shoe to the center of curvature of said ring, inserting said segments into the interior of said housing in spaced relationship about the periphery of said housing, inserting said pins into the interior of said housing between the faces of adjacent shoes and fastening said pins to said housing.

2. The method of claim 1 in which the step of machining the inside face of a ring of solid metal is followed by the step of babbitting the internal bore of said ring.

3. The method of claim 1 in which the step of cutting said ring into a plurality of segments includes the step of cutting said ring into an equal number of alternate small and large sections, said large sections being said segments inserted into the interior of said housing, and the faces of each said small section being parallel to each other.

References Cited

UNITED STATES PATENTS

| | | | |
|---|---|---|---|
| 1,421,695 | 7/1922 | Kingburg | 308—160 |
| 1,465,988 | 8/1923 | Kingburg | 29—149.5 |
| 2,235,931 | 3/1941 | Kingburg | 308—73 |
| 2,480,114 | 8/1949 | Bradbury | 29—149.5 |
| 2,556,033 | 6/1951 | Flumerfelt | 29—416 |

THOMAS H. EAGER, *Primary Examiner.*